(12) United States Patent
Katou

(10) Patent No.: US 8,508,948 B2
(45) Date of Patent: Aug. 13, 2013

(54) COMMUNICATION APPARATUS

(75) Inventor: Naohiro Katou, Daito (JP)

(73) Assignee: Kyocera Corporation (JP)

( * ) Notice: Subject to any disclaimer, the term of this patent is extended or adjusted under 35 U.S.C. 154(b) by 120 days.

(21) Appl. No.: 13/281,067

(22) Filed: Oct. 25, 2011

(65) Prior Publication Data
US 2012/0106106 A1  May 3, 2012

(30) Foreign Application Priority Data

Oct. 27, 2010  (JP) .................................. 2010-240829

(51) Int. Cl.
*H05K 5/00* (2006.01)
*H05K 7/14* (2006.01)

(52) U.S. Cl.
USPC .............. 361/752; 361/679.26; 361/679.27; 361/679.28; 361/679.56; 361/753; 361/755; 361/784; 361/796; 361/799; 361/803; 455/347; 455/351; 455/575.1; 455/575.3; 455/575.5; 343/881; 343/882

(58) Field of Classification Search
USPC ................. 361/679.26–679.28, 679.56, 752, 361/753, 755, 784, 796, 799, 803; 343/881, 343/882; 455/347, 351, 575.1, 575.3, 575.5
See application file for complete search history.

(56) References Cited

U.S. PATENT DOCUMENTS

| | | | |
|---|---|---|---|
| 7,196,672 B2 * | 3/2007 | Iwai et al. | 343/702 |
| 7,751,860 B2 * | 7/2010 | Symons et al. | 455/575.3 |
| 7,787,915 B2 * | 8/2010 | Uejima et al. | 455/575.3 |
| 7,966,047 B2 * | 6/2011 | Demuynck | 455/575.1 |
| 8,121,657 B2 * | 2/2012 | Hiraoka | 455/575.1 |
| 8,139,374 B2 * | 3/2012 | Hiraoka | 361/803 |
| 8,189,332 B2 * | 5/2012 | Kondu | 361/679.56 |
| 8,265,718 B2 * | 9/2012 | Horihata et al. | 455/575.3 |
| 2006/0111159 A1 * | 5/2006 | Ide | 455/575.1 |
| 2011/0130102 A1 * | 6/2011 | Nishizono et al. | 455/75 |

FOREIGN PATENT DOCUMENTS

| | | |
|---|---|---|
| JP | 2009-130468 A | 6/2009 |
| JP | 2010-154445 A | 7/2010 |

* cited by examiner

*Primary Examiner* — Ramon Barrera
(74) *Attorney, Agent, or Firm* — Studebaker & Brackett PC

(57) ABSTRACT

A communication apparatus includes first and second housings connected to each other by a hinge mechanism. The first housing includes a first substrate having electronic components electrically connected to an antenna, a first hinge portion configuring a portion of the hinge mechanism, and a first conductive member provided in the first hinge portion. The second housing includes a second substrate having electronic components, a waterproofing partition wall surrounding the second substrate, a second hinge portion configuring a portion of the hinge mechanism, a second conductive member provided in the second hinge portion to be capacitively-coupled with the first conductive member, and a third conductive member insertion-molded therein. The third conductive member includes an inner portion positioned on an inner side of the partition wall, and an outer portion extending from the inner portion toward an outer side of the partition wall and capacitively-coupled with the second conductive member.

5 Claims, 12 Drawing Sheets

COMMUNICATION APPARATUS

CROSS-REFERENCE TO RELATED APPLICATION

This application claims priority from Japanese Patent Application No. 2010-240829, filed on Oct. 27, 2010, the entire subject matter of which is incorporated herein by reference.

BACKGROUND OF THE INVENTION

1. Field of the Invention

The present invention relates to a communication apparatus which has a waterproofing function and performs communication using an antenna.

2. Description of the Related Art

There have been proposed various techniques regarding communication apparatuses. Specifically, one related art proposes a technique for improving the performance of an antenna of a communication apparatus, and another related art describes a waterproof communication apparatus. In such a waterproof communication apparatus, in order to improve the performance of an antenna as the one related art, it is demanded to improve the performance of the antenna while maintaining the waterproofing performance.

In view of the above, an aspect of the present invention provides a technique capable of improving the performance of an antenna of a communication apparatus while maintaining the waterproofing performance.

SUMMARY OF THE INVENTION

According to an illustrative embodiment of the present invention, there is provided a communication apparatus configured to perform communication using an antenna. The communication apparatus comprises first and second housings which are connected to each other by a hinge mechanism to be openable and closable. The first housing includes: a first substrate which includes electronic components mounted thereon and electrically connected to the antenna; a first-housing-side hinge portion which configures a portion of the hinge mechanism; and a first conductive member which is electrically connected to a ground pattern of the first substrate. The second housing includes: a second substrate which includes electronic components mounted thereon; a waterproofing partition wall which surrounds the second substrate; a second-housing-side hinge portion which is provided on an outer side relative to the partition wall, and configures a portion of the hinge mechanism; a second conductive member; and a third conductive member which is insertion-molded in the second housing, and is electrically connected to a ground pattern of the second substrate. The first conductive member is provided in the first-housing-side hinge portion. The second conductive member is provided in the second-housing-side hinge portion to be capacitively-coupled with the first conductive member. The third conductive member includes: an inner portion which is positioned on an inner side relative to an outer side surface of the partition wall, and is electrically connected to the ground pattern of the second substrate; and an outer portion which extends from the inner portion toward an outer side of the partition wall, and is capacitively-coupled with the second conductive member.

According to another illustrative embodiment of the present invention, there is provided a communication apparatus configured to perform communication using an antenna. The communication apparatus comprises first and second housings which are connected to each other by a hinge mechanism to be openable and closable. The first housing includes: a first substrate which includes electronic components mounted thereon and electrically connected to the antenna; a first-housing-side hinge portion which configures a portion of the hinge mechanism; and a first conductive member which is electrically connected to a ground pattern of the first substrate. The second housing includes: a second substrate which includes electronic components mounted thereon; a waterproofing partition wall which surrounds the second substrate; a second-housing-side hinge portion which is provided on an outer side relative to the partition wall, and configures a portion of the hinge mechanism; a second conductive member; and a third conductive member which is formed in a thickness portion of the second housing, and is electrically connected to a ground pattern of the second substrate. The first conductive member is provided in the first-housing-side hinge portion. The second conductive member is provided in the second-housing-side hinge portion to be capacitively-coupled with the first conductive member. The third conductive member includes: an inner portion which is positioned on an inner side relative to an outer side surface of the partition wall, and is electrically connected to the ground pattern of the second substrate; and an outer portion which extends from the inner portion toward an outer side of the partition wall, is capacitively-coupled with the second conductive member, and is not exposed from the thickness portion of the second housing.

In the above communication apparatus, the inner portion of the third conductive member may be partially exposed from the thickness portion of the second housing.

In the above communication apparatus, the outer portion of the third conductive member may be formed with a squeezed portion.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION OF THE INVENTION

Figure 1:
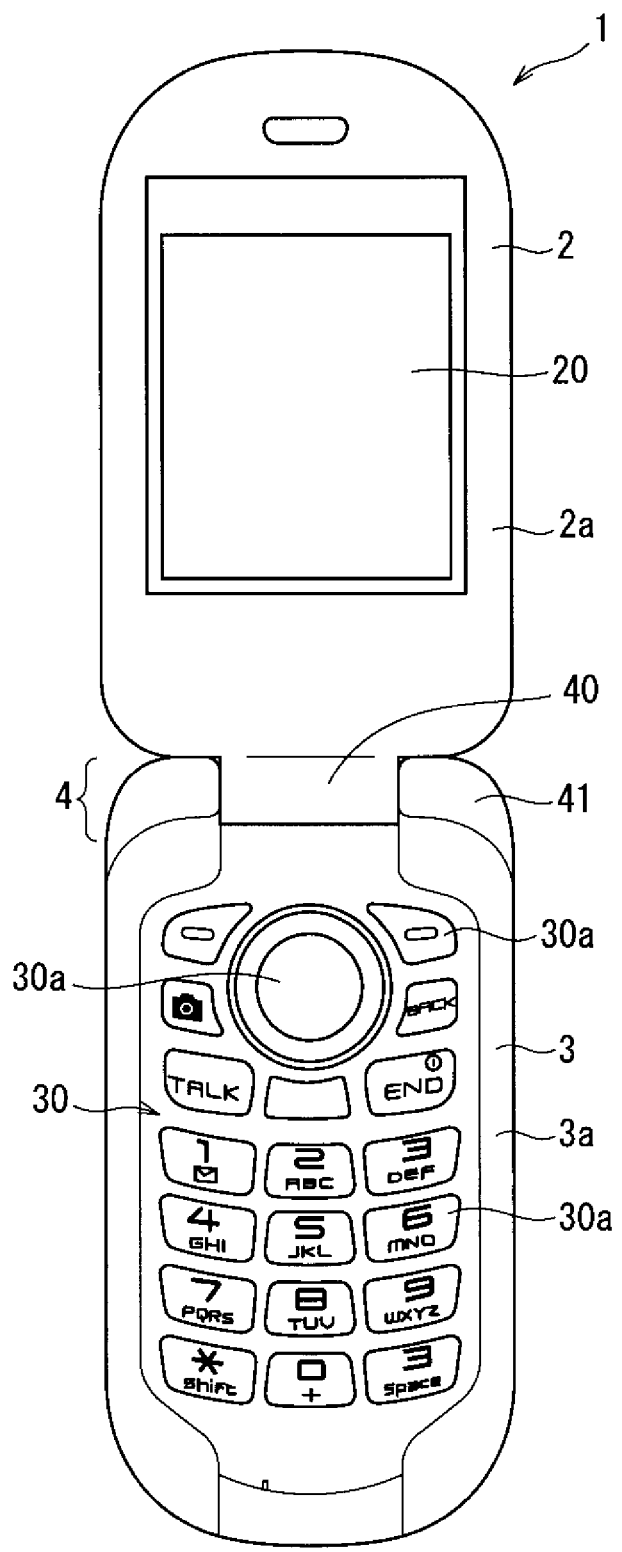
FIG. 1 is a plan view illustrating an outer appearance of a portable phone according to an illustrative embodiment of the present invention.
Figure 2:
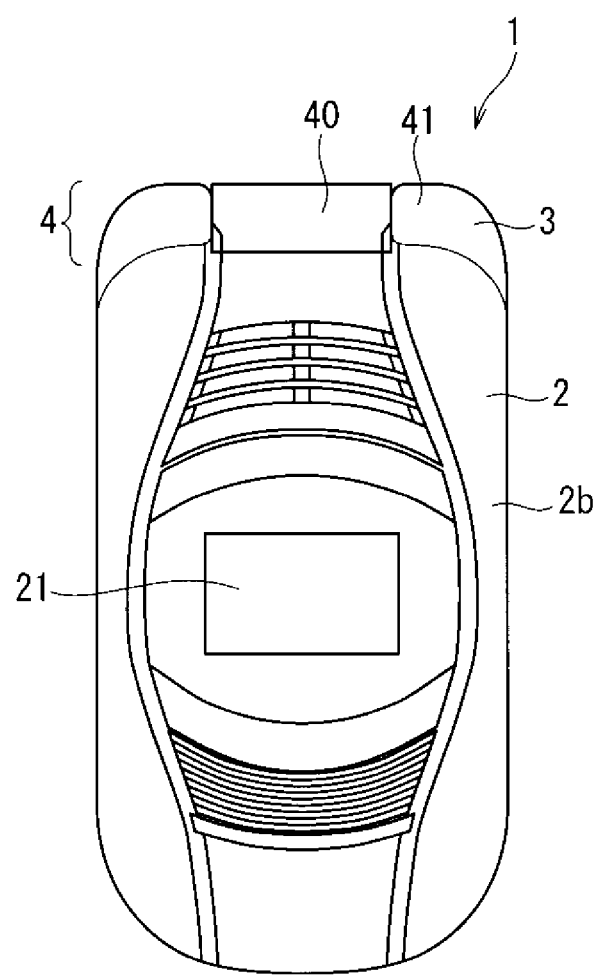
FIG. 2 is a plan view illustrating an outer appearance of the portable phone according to the illustrative embodiment.

FIGS. 1 and 2 are plan views illustrating an outer appearance of a communication apparatus according to an illustrative embodiment of the present invention. The communication apparatus according to the present illustrative embodiment is, for example, a portable phone, has a waterproofing function, and performs communication with another communication apparatus by using an antenna. Hereinafter, the communication apparatus according to the present illustrative embodiment is referred to as a portable phone 1.

The portable phone 1 is a so-called folding portable phone, and includes a display-side housing 2 including a display unit, and a manipulation-side housing 3 including a manipulation unit to be manipulated by a user. The display-side housing 2 and the manipulation-side housing 3 are made of a resin in an approximately cube shape slightly long in one direction.

One end portion of the display-side housing 2 in a longitudinal direction thereof, and one end portion of the manipulation-side housing 3 in a longitudinal direction thereof are connected by a hinge mechanism 4 such that the longitudinal directions of the display-side housing 2 and the manipulation-side housing 3 are aligned. The hinge mechanism 4 includes a pair of a display-side hinge portion 40 provided to the display-side housing 2, and a manipulation-side hinge portion 41 provided to the manipulation-side housing 3. An operation of the hinge mechanism 4 enables the display-side housing 2 and the manipulation-side housing 3 to rotate relatively to each other. Accordingly, the display-side housing 2 and the manipulation-side housing 3 are openable and closable.

FIG. 1 shows an open state of the display-side housing 2 and the manipulation-side housing 3, and FIG. 2 shows a closed state of the display-side housing 2 and the manipulation-side housing 3. Hereinafter, the open state of the display-side housing 2 and the manipulation-side housing 3 is referred to as the open state of the portable phone 1, and the closed state of the display-side housing 2 and the manipulation-side housing 3 is referred to as the closed state of the portable phone 1.

In the display-side housing 2, a main display 20, and a sub display 21 having a display screen smaller than that of the main display 20 are provided. The main display 20 is visible from one main surface 2a side of the display-side housing 2. The sub display 21 is visible from the other main surface 2b side of the display-side housing 2 which is opposite to the one main surface 2a.

The manipulation-side housing 3 is provided with a manipulation unit 30 having a plurality of manipulation keys 30a. The manipulation unit 30 is exposed from one main surface 3a of the manipulation-side housing 3, and can be manipulated by a user.

As shown in FIG. 2, when the portable phone 1 is in the closed state, the display-side housing 2 and the manipulation-side housing 3 overlap each other such that the main surface 2a of the display-side housing 2 and the main surface 3a of the manipulation-side housing 3 face each other. Therefore, when the portable phone 1 is in the closed state, the main display 20 and the manipulation unit 30 are not visible, and the sub display 21 is visible.

When the portable phone 1 is in the closed state, the display-side housing 2 and the manipulation-side housing 3 overlaps each other. In this state, if the main surface 2a of the display-side housing 2 and the main surface 3a of the manipulation-side housing 3 are opened so as to be separate from each other, the portable phone 1 becomes the open state as shown in FIG. 1. When the portable phone 1 is in the open state, the main display 20 of the display-side housing 2 and the manipulation unit 30 of the manipulation-side housing 3 are visible. The user can manipulate the manipulation unit 30 while checking display of the main display 20.

<Structure of Display-Side Housing>

Figure 3:
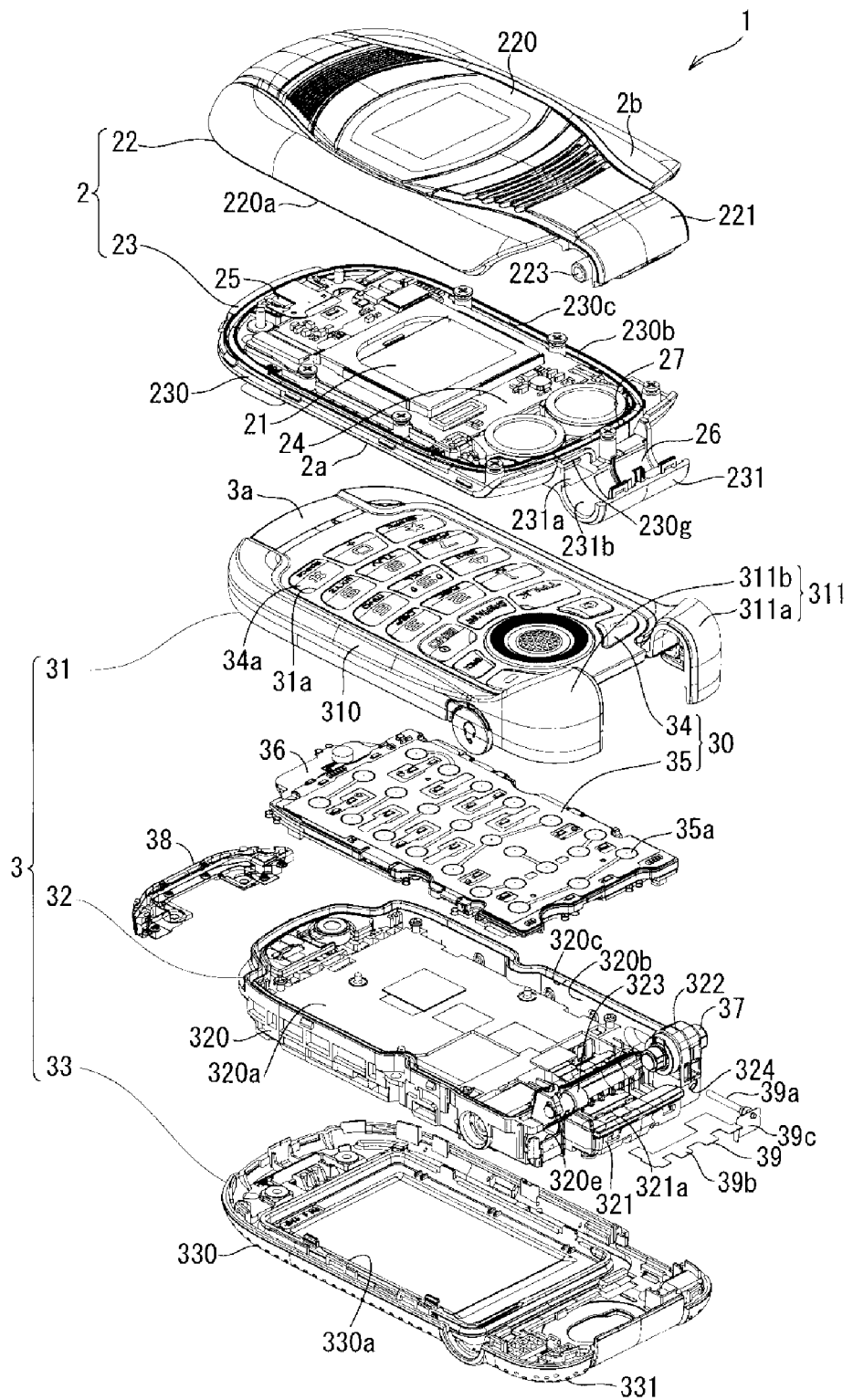
FIG. 3 is an exploded perspective view illustrating the portable phone according to the illustrative embodiment.

FIG. 3 is an exploded perspective view of the portable phone 1. As shown in FIG. 3, the display-side housing 2 includes a display-side front member 23 which becomes a front side relative to the user when the portable phone 1 is in the open state, and a display-side rear member 22 which becomes a rear side relative to the user when the portable phone 1 is in the open state. The display-side housing 2 is provided therein with components such as the main display 20, the sub display 21, a display-side substrate 24 having a plurality of electronic components mounted thereon, and a speaker 25. The display-side substrate 24 includes electronic components for driving the speaker 25, electronic components for driving the main display 20, electronic components for driving the sub display 21, and so on mounted thereon. Further, the display-side substrate 24 is formed thereon with a signal pattern for transmitting signals to each electronic component, a power supply pattern for supplying a positive power supply potential to each electronic component, and a ground pattern for supplying a ground potential to each electronic component.

Figure 4:
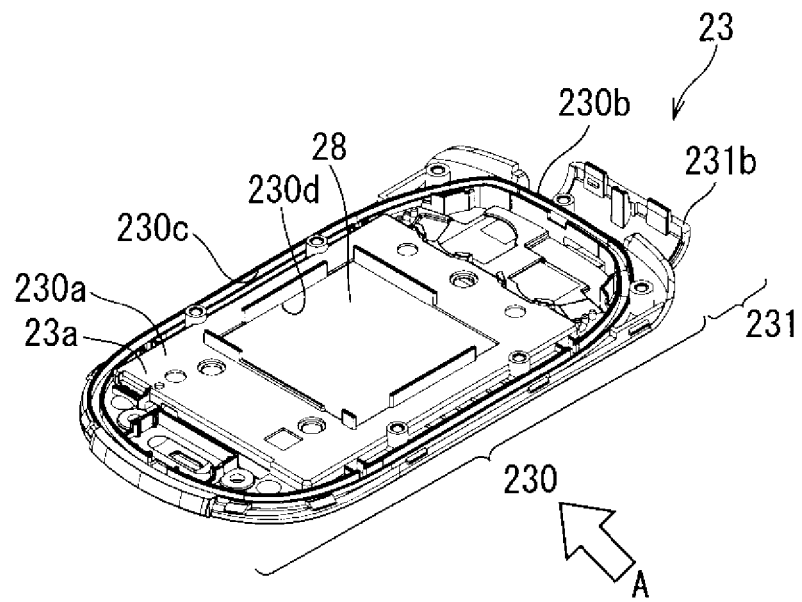
FIG. 4 is a perspective view illustrating a display-side front member according to the illustrative embodiment.
Figure 5:
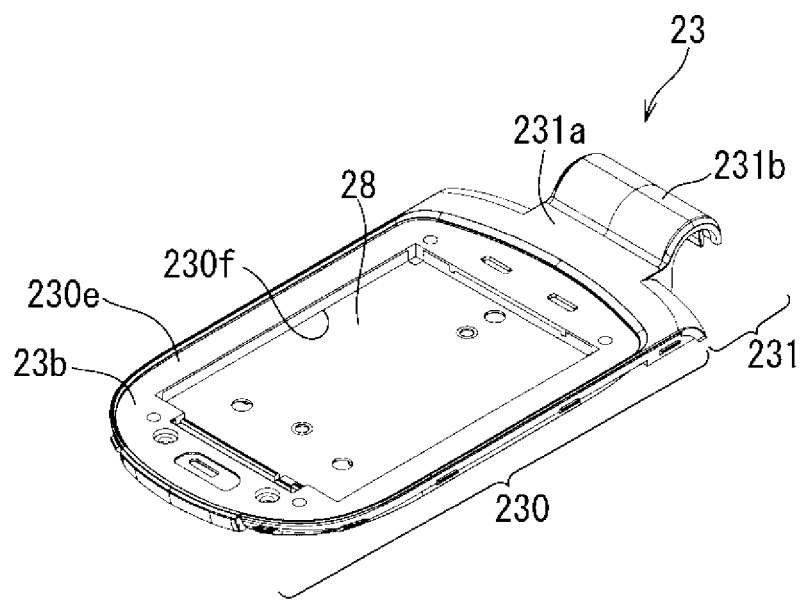
FIG. 5 is a perspective view illustrating the display-side front member according to the illustrative embodiment.
Figure 6:
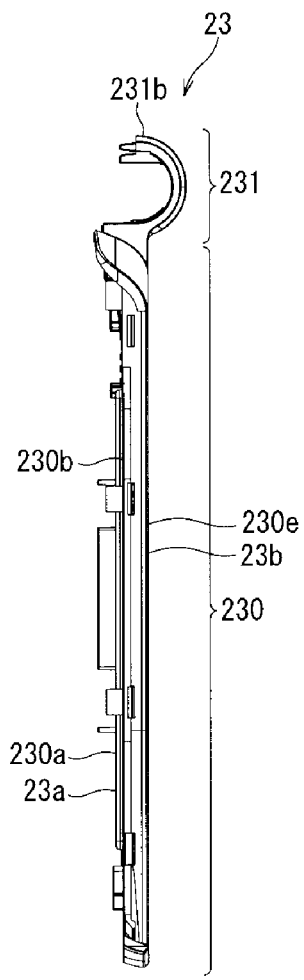
FIG. 6 is a side view illustrating the display-side front member according to the illustrative embodiment.

FIGS. 4 to 6 are views illustrating a structure of a display-side front member 23. FIG. 4 is a perspective view of the display-side front member 23 taken as seen from one main surface 23a side of the display-side front member 23, and FIG. 5 is a perspective view of the display-side front member 23 taken as seen from the other main surface 23b side of the display-side front member 23. FIG. 6 is a side view of the display-side front member 23 as seen in a direction of arrow A of FIG. 4. When the portable phone 1 is in the closed state, the main surface 23b is positioned on the manipulation-side housing 3 side, and the main surface 23a is positioned on the display-side rear member 22 side.

As shown in FIGS. 3 to 6, the display-side front member 23 includes an electronic-component storage portion 230 in which the electronic components are mainly disposed and which needs prevention of water penetration, and a display-side first hinge case 231 configuring a portion of the display-side hinge portion 40. The main display 20, the sub display 21, the display-side substrate 24, and the speaker 25 are disposed in the electronic-component storage portion 230. In the display-side first hinge case 231, a conductive member 26 (see FIG. 3) is disposed. The conductive member 26 will be described below in detail.

On a main surface 230a of the electronic-component storage portion 230 on the display-side rear member 22 side, the sub display 21, the display-side substrate 24, the speaker 25, and so on are disposed. On the main surface 230a of the electronic-component storage portion 230, a partition wall 230b for waterproofing (waterproofing partition wall) is provided to stand along the outer edge of the main surface 230a such that various components disposed on the main surface 230a are surrounded. On the upper end surface of the partition wall 230b, a groove 230c is provided. A ring-shaped packing 27 for waterproofing (see FIG. 3) is put in the groove 230c.

In the display-side front member 23, a conductive member 28 is formed by insertion-molding. The conductive member 28 is provided inside a thickness portion of the display-side front member 23. As shown in FIGS. 4 and 5, the conductive member 28 is partially exposed from the display-side front member 23. The conductive member 28 is provided to increase the rigidity of the display-side front member 23 and to function as a ground plane to improve the characteristics of an antenna of the portable phone 1. The conductive member 28 will be described below in detail.

As shown in FIG. 4, at the center portion of the main surface 230a of the electronic-component storage portion 230, a rectangular opening 230d is formed to expose the conductive member 28. In the opening 230d, the sub display 21 is disposed, and the display-side substrate 24 is disposed to surround the sub display 21. On the display-side substrate 24, a conductive member (not shown) is provided to be connected to the ground pattern. This conductive member is in contact with a portion of the conductive member 28 exposed from the display-side front member 23. Therefore, the ground pattern of the display-side substrate 24 and the conductive member 28 are electrically connected to each other.

As shown in FIG. 5, in a large portion of the opposite main surface 230e of the electronic-component storage portion 230 to the main surface 230a, a rectangular opening 230f is formed to expose the conductive member 28. In the opening 230f, the main display 20 is disposed. On the main surface 23b of the display-side front member 23, a cover (not shown) for protecting the main display 20 is attached.

Figure 7:
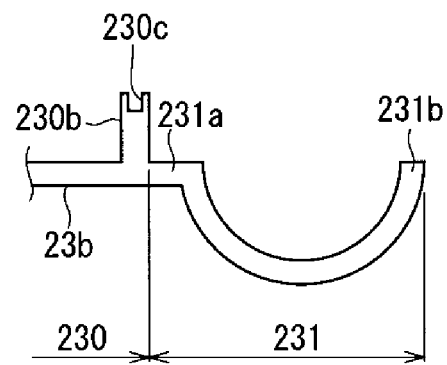
FIG. 7 is a cross-sectional view illustrating a first hinge case according to the illustrative embodiment.

FIG. 7 is a cross-sectional view illustrating a schematic structure of the display-side first hinge case 231. FIG. 7 shows a cross-section structure of the display-side first hinge case 231 in the longitudinal direction of the display-side front member 23.

As shown in FIGS. 3 to 7, the display-side first hinge case 231 includes a flat portion 231a connected to the partition wall 230b of the electronic-component storage portion 230, and a curved portion 231b connected to an end of the flat portion 231a. The curved portion 231b has a semi-circular section, and is formed to be convex toward the main surface 23b of the display-side front member 23. The conductive member 26 is disposed in the display-side first hinge case 231 such that a portion of the conductive member 26 is in contact with a surface of the flat portion 231a on the display-side rear member 22, and the remaining portion of the conductive member 26 is in contact with an inner surface (surface on the display-side rear member 22 side) of the curved portion 231b. The display-side first hinge case 231 configures a portion of an outer portion (case) of the display-side hinge portion 40.

The display-side rear member 22 includes an electronic-component storage portion 220 fitted with the electronic-component storage portion 230 of the display-side front member 23, and a display-side second hinge case 221 configuring a portion of the display-side hinge portion 40 and fitted with the display-side first hinge case 231 of the display-side front member 23. In an assembled state of the display-side rear member 22 and the display-side front member 23, the main display 20, the display-side substrate 24, and the speaker 25 are disposed between the electronic-component storage portions 220 and 230.

Similarly to the electronic-component storage portion 230, on a main surface 220a of the electronic-component storage portion 220 on the display-side front member 23 side, a partition wall for waterproofing (waterproofing partition wall) is provided to stand such that various components disposed between the electronic-component storage portions 220 and 230 are surrounded. If the display-side rear member 22 is attached to the display-side front member 23, the partition wall of the electronic-component storage portion 220 is fitted into the groove 230c of the upper end surface of the partition wall 230b, so as to press the packing 27 for waterproofing in the partition wall 230b of the electronic-component storage portion 230 against the partition wall 230b. Therefore, it is prevented water from penetrate into a space surrounded by the electronic-component storage portions 220 and 230, so that the electronic components in the corresponding space is protected.

Figure 8:
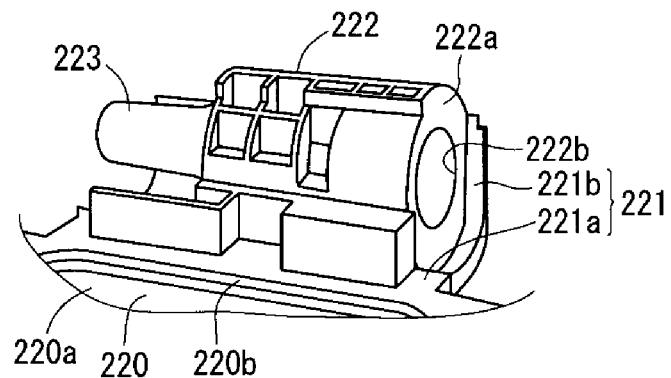
FIG. 8 is a cross-sectional view illustrating a second hinge case according to the illustrative embodiment.

FIG. 8 is a perspective view illustrating a structure of the display-side second hinge case 221. As shown in FIGS. 3 and 8, the display-side second hinge case 221 includes a flat portion 221a connected to the partition wall 220b of the electronic-component storage portion 220, and a curved portion 221b connected to an end of the flat portion 221a. The curved portion 221b has an arc-shaped section. The curved portion 221b is formed to be convex toward the opposite main surface of the display-side rear member 22 to the display-side front member 23. The display-side second hinge case 221 configures a portion of the outer portion (case) of the display-side hinge portion 40.

On a surface of the display-side second hinge case 221 on the display-side front member 23, a bearing unit 222 is provided to allow a hinge shaft 37 (see FIG. 3) (to be described below) provided in the manipulation-side housing 3 to be fitted therein. The bearing unit 222 configures a portion of the display-side hinge portion 40.

The bearing unit 222 is cylindrical, and extends along a widthwise direction of the display-side rear member 22. In one flat surface 222a of the bearing unit 222 in the extension direction thereof, a fitting hole 222b is provided to allow the hinge shaft 37 to be fitted thereinto. The other flat surface of the bearing unit 222 in the extension direction is connected to one end of a winding shaft 223 wounded with a flat cable. Around the winding shaft 223, the flat cable (not shown) is wound to electrically connect the display-side substrate 24 stored in the display-side housing 2, and a manipulation-side substrate 36 (to be described below) stored in the manipulation-side housing 3. Hereinafter, the flat cable will be referred to as an inter-substrate connection cable.

In the display-side housing 2, the display-side first hinge case 231 and the display-side second hinge case 221 form the case of the display-side hinge portion 40 of the hinge mechanism 4, and the bearing unit 222 and the winding shaft 223 are provided in the corresponding case.

<Structure of Manipulation-Side Housing>

As shown in FIG. 3, the manipulation-side housing 3 includes a manipulation-side front member 31 to be a front side relative to the user when the portable phone 1 is in the open state, a manipulation-side rear member 32 to be a rear side relative to the user when the portable phone 1 is in the open state, and a rear cover member 33 which partially cover an opposite main surface of the manipulation-side rear member 32 to the manipulation-side front member 31 side.

In the manipulation-side housing 3, the manipulation unit 30, the manipulation-side substrate 36 having a plurality of electronic components mounted thereon, the hinge shaft 37, an antenna 38, a conductive member 39, a battery (not shown), and so on are provided. On the manipulation-side substrate 36, high-frequency components, such as a filter and an amplifier, for processing a reception signal received by the antenna 38, high-frequency components for processing a transmission signal to be input to the antenna 38, a CPU for managing an operation of the entire portable phone 1, and so on are mounted. Further, on the manipulation-side substrate 36, a signal pattern for transmitting signals to each electronic component, a power supply pattern for the positive power supply potential to each electronic component, and a ground pattern for supplying the ground potential to each electronic component are formed.

The manipulation unit 30 includes a sheet-shaped switch substrate 35 having a plurality of switches 35a, and a key cover member 34 which covers the switch substrate 35. On a surface of the key cover member 34, a plurality of protrusions 34a are formed at positions corresponding to the arrangement positions of the plurality of switches 35a of the switch substrate 35. Further, the key cover member 34 is disposed on a main surface of the manipulation-side front member 31 on the manipulation-side rear member 32 side such that the plurality of protrusions 34a are exposed from a plurality of holes 31a formed in the manipulation-side front member 31. One manipulation key 30a (see FIG. 1) is configured by one switch 35a and one protrusion 34a covering the corresponding switch 35a.

The manipulation-side substrate 36 is disposed on the manipulation-side rear member 32 so as to overlap the switch substrate 35. The antenna 38 is used when the portable phone 1 performs radio communication, and is attached to the manipulation-side rear member 32. Further, the antenna 38 is electrically connected to the high-frequency components mounted on the manipulation-side substrate 36. Therefore, a signal received by the antenna 38 is processed by the high-frequency components on the manipulation-side substrate 36, and a transmission signal is processed by the high-frequency components on the manipulation-side substrate 36 and then is input to the antenna 38.

The manipulation-side rear member 32 includes an electronic-component storage portion 320 in which the electronic components are mainly disposed and which needs prevention of water penetration, and a base portion 321 configuring a portion of the manipulation-side hinge portion 41. The antenna 38 is attached to an opposite end portion of the electronic-component storage portion 320 to the base portion 321 in the longitudinal direction of the manipulation-side rear member 32. The switch substrate 35 and the manipulation-side substrate 36 are disposed on a main surface 320a of the electronic-component storage portion 320 on the manipulation-side front member 31 side, with the manipulation-side substrate 36 below the switch substrate 35. The battery for supplying power to each electronic component of the portable phone 1 is disposed on a main surface of the electronic-component storage portion 320 on the rear cover member 33 side.

On the main surface 320a of the electronic-component storage portion 320, a partition wall 320b for waterproofing (waterproofing partition wall) is provided along the outer edge to stand such that various components disposed on the main surface 320a are surrounded. On the upper end surface of the partition wall 320b, a groove 320c is provided. A ring-shaped packing (not shown) for waterproofing is provided on a rear surface of the key cover member 34 of the manipulation unit 30, and when the manipulation-side front member 31 is attached to the manipulation-side rear member 32, the packing for waterproofing is fitted into the groove 320c of the partition wall 320b of the manipulation-side rear member 32. Therefore, it may be possible to prevent water from penetrating into the inside of the partition wall 320b, so as to protect various electronic components disposed on the main surface 320a of the electronic-component storage portion 320.

Figure 9:
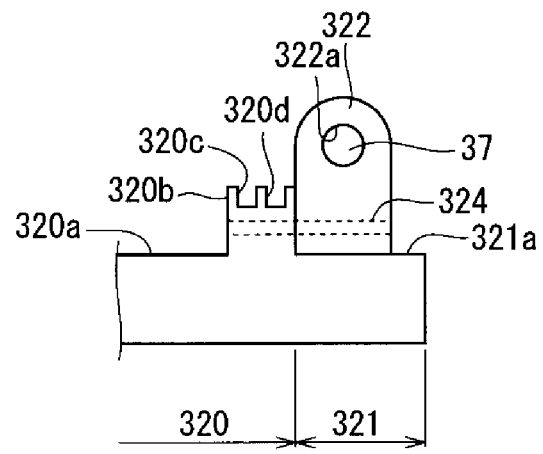
FIG. 9 is a cross-sectional view illustrating the vicinity of a base portion of a manipulation-side rear member according to the illustrative embodiment.

FIG. 9 is a cross-sectional view illustrating a schematic structure of the vicinity of the base portion 321 of the manipulation-side rear member 32. FIG. 9 shows a section structure in the longitudinal direction of the manipulation-side rear member 32. As shown in FIGS. 3 and 9, the base portion 321 is connected to the partition wall 320b of the electronic-component storage portion 320. On a main surface 321a of the base portion 321 on the manipulation-side front member 31 side, the conductive member 39 is disposed.

In the manipulation-side rear member 32, a bearing unit 322 and a winding shaft 323 are provided to face each other with the base portion 321 interposed therebetween in the widthwise direction. The bearing unit 322 allows the hinge shaft 37 to be fitted thereinto, and is connected to the base portion 321 and the partition wall 320b. The winding shaft 223 is wound with the above-mentioned inter-substrate connection cable, and is connected to the partition wall 320b. In the bearing unit 322, a fitting hole 322a is formed to penetrate through the bearing unit 322 in the widthwise direction of the manipulation-side rear member 32. The hinge shaft 37 is inserted and fitted into the fitting hole 322a, so as to be held by the bearing unit 322. The hinge shaft 37 and the bearing unit 322 configure a portion of the manipulation-side hinge portion 41.

In the bearing unit 322 and the partition wall 320b, a through-hole 324 is provided in the longitudinal direction of the manipulation-side rear member 32. A connection portion 39a (see FIG. 3) (to be described below) of the conductive member 39 is inserted into the through-hole 324 from the outer side of the manipulation-side rear member 32. Therefore, a leading end portion of the connection portion 39a enters the inner side of the partition wall 320b. The leading end portion is electrically connected to the ground pattern of the manipulation-side substrate 36. The conductive member 39 includes not only the connection portion 39a but also a mounted portion 39b to be mounted on the base portion 321, and a connection portion 39c connecting the connection portion 39a and the mounted portion 39b. The conductive member 39 and the conductive members 26 and 28 are for connecting the ground pattern of the manipulation-side substrate 36 and the ground pattern of the display-side substrate 24 in alternate-current manner. This point will be described below in detail.

On the upper end surface of the portion of the partition wall 320b connected to the base portion 321, as shown in FIG. 9, a fitting groove 320d for fitting with the manipulation-side front member 31 is provided.

The manipulation-side front member 31 includes the key cover member 34, a manipulation-key exposure portion 310 fitted with the electronic-component storage portion 320 of the manipulation-side rear member 32, and a manipulation-side first hinge case 311 configuring a portion of the manipulation-side hinge portion 41. In an assembled state of the manipulation-side front member 31 and the manipulation-side rear member 32, the manipulation unit 30 and the manipulation-side substrate 36 are disposed between the manipulation-key exposure portion 310 of the manipulation-side front member 31 and the electronic-component storage portion 320 of the manipulation-side rear member 32. The manipulation-side first hinge case 311 includes a first cover portion 311a for covering the bearing unit 322 provided to the manipulation-side rear member 32, and a second cover portion 311b for covering the winding shaft 323 provided to the manipulation-side rear member 32.

The rear cover member 33 includes a peripheral-edge cover portion 330, and a manipulation-side second hinge case 331 configuring a portion of the manipulation-side hinge portion 41. The peripheral-edge cover portion 330 is fitted with the manipulation-key exposure portion 310 of the manipulation-side front member 31 with the electronic-component storage portion 320 of the manipulation-side rear member 32 interposed therebetween. The peripheral-edge cover portion 330 covers a peripheral edge portion of a main surface of the electronic-component storage portion 320 of the manipulation-side rear member 32 on the rear cover member 33 side. In the peripheral-edge cover portion 330, an opening 330a for inserting the battery into the manipulation-side housing 3 is provided. A battery cover (not shown) for covering the opening 330a is attached to the rear cover member 33, to protect the battery put in the manipulation-side housing 3 from the opening 330a.

The manipulation-side second hinge case 331 is fitted with the manipulation-side first hinge case 311 of the manipulation-side front member 31 with the base portion 321 of the manipulation-side rear member 32 interposed therebetween. In the manipulation-side housing 3, the manipulation-side first hinge case 311 and the manipulation-side second hinge case 331 configure a case of the manipulation-side hinge portion 41 of the hinge mechanism 4, and the bearing unit 322, the hinge shaft 37, and the winding shaft 323 are provided in the corresponding case.

In the display-side housing 2 and the manipulation-side housing 3 having the above-mentioned structures, the display-side hinge portion 40 including the display-side first hinge case 231, the display-side second hinge case 221, and the bearing unit 222 is connected with the manipulation-side hinge portion 41 including the manipulation-side first hinge case 311, the manipulation-side second hinge case 331, the base portion 321, the bearing unit 322, and the hinge shaft 37 such that the display-side housing 2 is connected with the manipulation-side housing 3.

If the display-side hinge portion 40 and the manipulation-side hinge portion 41 are connected to each other, the display-side hinge portion 40 is disposed between the first cover portion 311a and the second cover portion 311b of the manipulation-side first hinge case 311 so as to face the base portion 321 of the manipulation-side hinge portion 41. Then, the hinge shaft 37 held by the bearing unit 322 in the manipulation-side hinge portion 41 and the bearing unit 222 of the display-side hinge portion 40 are fitted together. Therefore, the display-side housing 2 and the manipulation-side housing 3 become rotatable around the center of the hinge shaft 37 with respect to each other such that the display-side housing 2 and the manipulation-side housing 3 are openable and closable.

One end of the inter-substrate connection cable is connected to the display-side substrate 24 surrounded by the partition wall 230b in the display-side front member 23, through a connector (not shown). At a portion of the partition wall 230b connected to the display-side first hinge case 231, a through-hole 230g (see FIG. 3) is formed. The other end of the inter-substrate connection cable is drawn out of the partition wall 230b through the through-hole 230g. The through-hole 230g is plugged with a packing for waterproofing.

Meanwhile, at a portion of the partition wall 320b of the manipulation-side rear member 32 in the vicinity of the base portion 321, a through-hole 320e (see FIG. 3) is provided. The other end of the inter-substrate connection cable drawn out of the partition wall 230b of the display-side housing 2 is introduced to the inner side of the partition wall 230b of the manipulation-side housing 3 through the through-hole 320e. Then, the other end of the inter-substrate connection cable is connected to the manipulation-side substrate 36 surrounded by the partition wall 230b through a connector (not shown).

The inter-substrate connection cable is wound around the winding shaft 223 in the display-side hinge portion 40 and the winding shaft 323 in the manipulation-side hinge portion 41 in a path from the partition wall 230b of the display-side housing 2 to the partition wall 320b of the manipulation-side housing 3. Therefore, the inter-substrate connection cable is contained in the hinge mechanism 4 in the path from the partition wall 230b of the display-side housing 2 to the partition wall 320b of the manipulation-side housing 3.

In this way, the display-side substrate 24 of the display-side housing 2 and the manipulation-side substrate 36 of the manipulation-side housing 3 are electrically connected to each other by the inter-substrate connection cable. The inter-substrate connection cable includes signal wires, power supply wires, and ground wires. Therefore, the signal pattern, the power supply pattern, and the ground pattern formed on the display-side substrate 24 are electrically connected to the signal pattern, the power supply pattern, and the ground pattern formed on the manipulation-side substrate 36, respectively.

<Structure of Each Conductive Member>

Next, the conductive members 26, 28, and 39 will be described in detail. Each of the conductive members 26, 28, and 39 is made of, for example, stainless steel.

Figure 10:
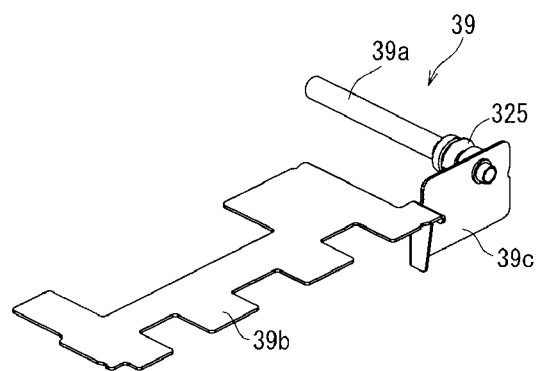
FIG. 10 is a perspective view illustrating a conductive member according to the illustrative embodiment.

FIG. 10 is a perspective view illustrating a structure of the conductive member 39. As shown in FIG. 10, the conductive member 39 includes the rod-shaped connection portion 39a which is inserted into the through-hole 324 provided in the manipulation-side rear member 32 and is connected to the manipulation-side substrate 36, the plate-shaped mounted portion 39b mounted on the base portion 321 of the manipulation-side rear member 32, and the plate-shaped connection portion 39c connecting the connection portion 39a and the mounted portion 39b. On the connection portion 39a, a ring-shaped packing 325 for waterproofing is attached for filling the through-hole 324 when the connection portion 39a is inserted into the through-hole 324.

Figure 11:
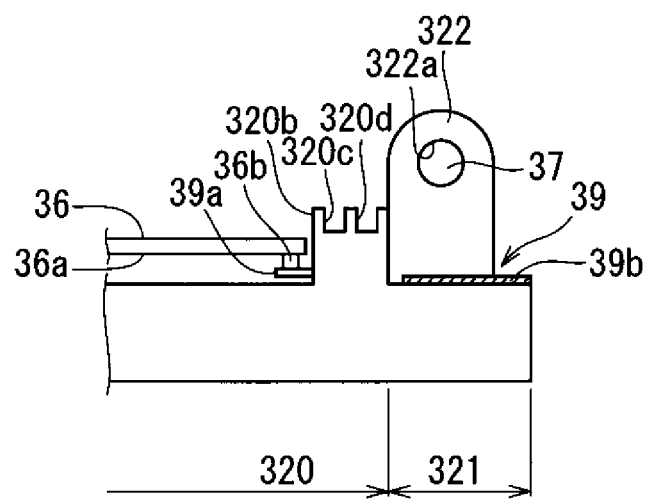
FIG. 11 is a view illustrating a connection state of the conductive member and a manipulation-side substrate.

FIG. 11 is a view illustrating a connection state of the connection portion 39a of the conductive member 39 and the manipulation-side substrate 36. FIG. 11 shows a schematic section structure of the vicinity of the base portion 321 of the manipulation-side rear member 32 provided with the manipulation-side substrate 36 and the conductive member 39.

As shown in FIG. 11, on a main surface 36a of the manipulation-side substrate 36 on the manipulation-side rear member 32 side, the conductive member 36b connected to the ground pattern of the manipulation-side substrate 36 is mounted. If the conductive member 39 is attached to the manipulation-side rear member 32 and the manipulation-side substrate 36 is disposed in the inside of the partition wall 320b such that the mounted portion 39b is mounted on the base portion 321, while the connection portion 39a is inserted into the through-hole 324 penetrating through the bearing unit 322 and the partition wall 320b, the leading end portion of the connection portion 39a abuts on the conductive member 36b on the manipulation-side substrate 36. Therefore, the ground pattern of the manipulation-side substrate 36 and the conductive member 39 are electrically connected to each other.

Figure 12:
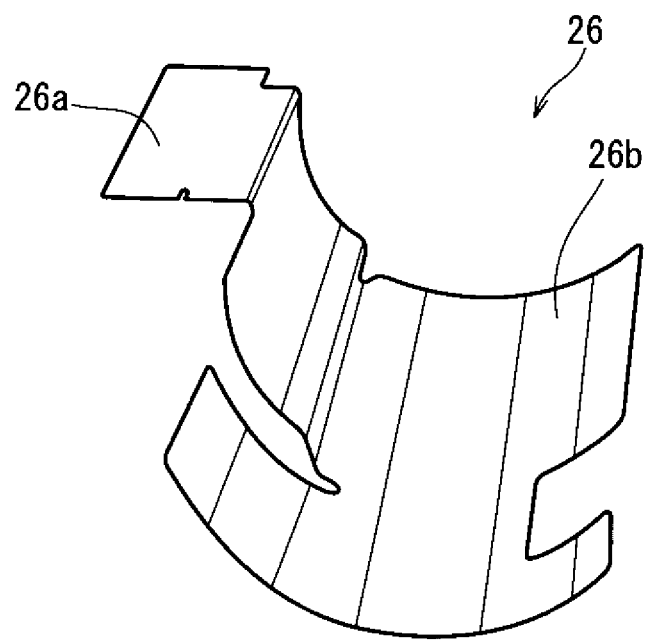
FIG. 12 is a perspective view illustrating another conductive member according to the illustrative embodiment.

Next, a structure of the conductive member 26 will be described. FIG. 12 is a perspective view illustrating the structure of the conductive member 26. As shown in FIG. 12, the conductive member 26 includes a flat portion 26a, and a curved portion 26b connected to an end of the flat portion 26a. When the conductive member 26 is disposed in the display-side first hinge case 231, the flat portion 26a of the conductive member 26 is mounted on a surface of the flat portion 231a of the display-side first hinge case 231 on the display-side rear member 22 side, and the curved portion 26b of the conductive member 26 is mounted on an inner surface of the curved portion 231b of the display-side first hinge case 231. A shape of an outer surface of the curved portion 26b corresponds to the shape of the inner surface of the curved portion 231b, and thus the curved portion 26b and the curved portion 231b are brought into contact with each other.

Figure 13:
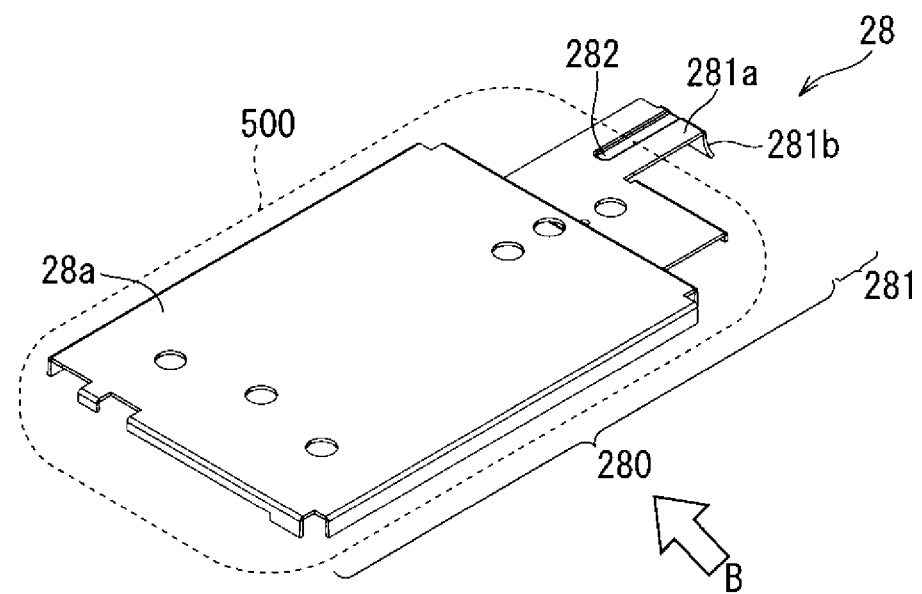
FIG. 13 is a perspective view illustrating still another conductive member according to the illustrative embodiment.
Figure 14:
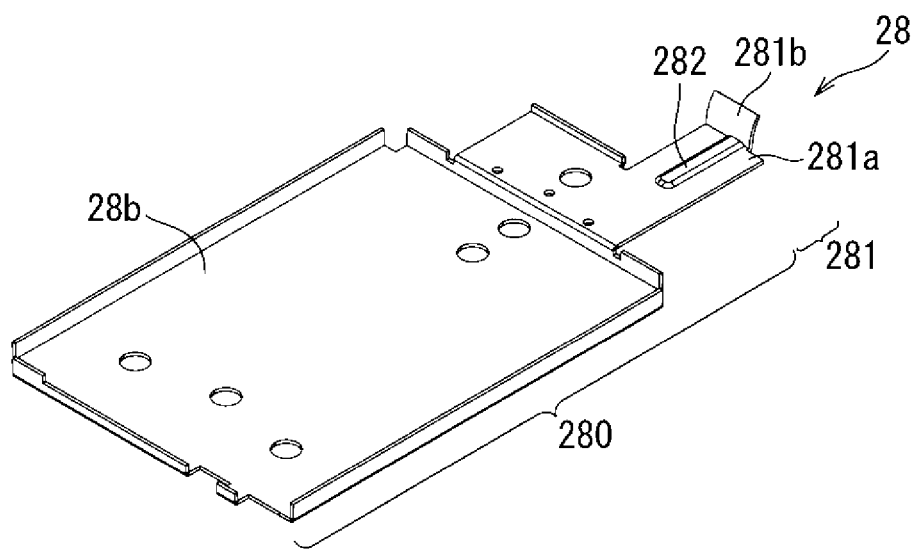
FIG. 14 is another perspective view illustrating the still another conductive member according to the illustrative embodiment.
Figure 15:
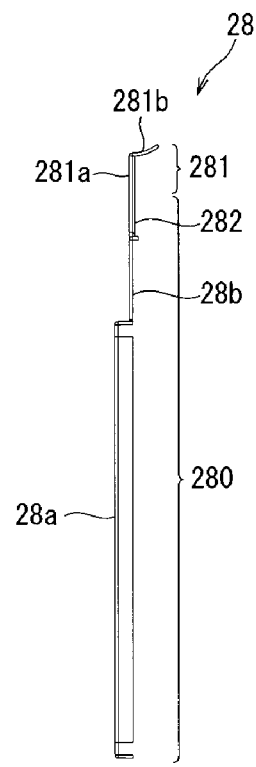
FIG. 15 is a side view illustrating the still another conductive member according to the illustrative embodiment.

Next, a structure of the conductive member 28 will be described. FIGS. 13 to 15 are views illustrating the structure of the conductive member 28. FIG. 13 is a perspective view of the conductive member 28 as seen from one main surface 28a of the conductive member 28, and FIG. 14 is a perspective view of the conductive member 28 as seen from the other main surface 28b of the conductive member 28. FIG. 15 is a side view illustrating the conductive member 28 as seen in a direction of arrow B of FIG. 13. The conductive member 28 is formed in the display-side front member 23 by insertion-molding such that the main surface 28a of the conductive member 28 is directed toward the main surface 23a of the display-side front member 23 on the display-side rear member 22 side. FIG. 13 shows an inner area relative to the outer side surface of the partition wall 230b when the conductive member 28 is formed in the display-side front member 23 by the insertion-molding, by a broken line 500. In other words, the portion shown by the broken line 500 corresponds to the position of the outer side surface of the partition wall 230b.

As shown in FIGS. 13 to 15, the conductive member 28 includes a portion 280 on the inner side of the partition wall, and a portion 281 on the inner side of the partition wall. The portion 280 on the inner side of the partition wall is positioned on the inner side relative to the outer surface of the partition wall 230b when the display-side front member 23 is formed by the insertion-molding, and is electrically connected to the display-side substrate 24. The portion 281 on the inner side of the partition wall extends from the portion 280 on the inner side of the partition wall toward the outer side of the partition wall 230b when the display-side front member 23 is formed by the insertion-molding. The portion 281 on the inner side of the partition wall is capacitively-coupled with the conductive member 26. The portion 280 on the inner side of the partition wall is integrated with the electronic-component storage portion 230, and the portion 281 on the inner side of the partition wall is integrated with the display-side first hinge case 231.

The portion 281 on the inner side of the partition wall includes a flat portion 281a connected to an end of the portion 280 on the inner side of the partition wall, and a curved portion 281b connected to an end of the flat portion 281a. A section shape of the curved portion 281b is an arc shape. The curved portion 281b is formed to be convex toward the main surface 28a of the conductive member 28 side.

In the conductive member 28, an elongated squeezed portion 282 is provided from an interface portion of the portion 280 on the inner side of the partition wall with the portion 281 on the inner side of the partition wall to the flat portion 281a of the portion 281 on the inner side of the partition wall. The squeezed portion 282 is provided in the conductive member 28 in a direction in which the portion 281 on the inner side of the partition wall extends from the portion 280 on the inner side of the partition wall toward the outer side of the partition wall 230b, so that the main surface 28a side becomes hollow.

Figure 16:
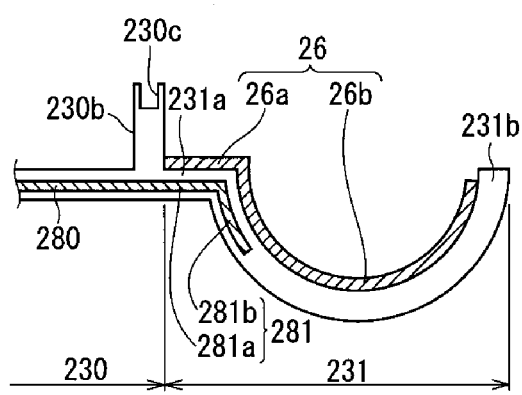
FIG. 16 is a view illustrating a relation of position between two conductive members.

FIG. 16 is a view illustrating a relation of position between the conductive member 26 and the portion 281 on the inner side of the partition wall capacitively-coupled with the conductive member 26. FIG. 16 shows a schematic selection structure of the display-side first hinge case 231 with the conductive member 28 insertion-molded therein, and the conductive member 26 disposed in the display-side first hinge case 231. As shown in FIG. 16, the flat portion 26a of the conductive member 26 and the flat portion 281a of the portion 281 on the inner side of the partition wall are disposed to face each other with the display-side front member 23 interposed therebetween. Further, the curved portion 26b of the conductive member 26 and the curved portion 281b of the portion 281 on the inner side of the partition wall are disposed to face each other with the display-side front member 23 interposed therebetween. Therefore, the conductive member 26 and the conductive member 28 are capacitively-coupled with each other.

<Capacitive Coupling of Three Conductive Members>

In the portable phone 1 according to the present illustrative embodiment, in order to improve the characteristics of the antenna 38, it is required to form the ground plane in which a high-frequency current flowing in the antenna 38 can flow, as large as possible.

For this reason, in the present illustrative embodiment, the conductive member 39 in the manipulation-side hinge portion 41, electrically connected to the ground pattern of the manipulation-side substrate 36, is capacitively-coupled with the conductive member 26 in the display-side hinge portion 40, is electrically connected to the conductive member 26 and the ground pattern of the display-side substrate 24, and is capacitively-coupled with the conductive member 28 insertion-molded in the display-side housing 2 such that the ground pattern of the manipulation-side substrate 36 and the ground plane of the display-side substrate 24 are connected to each other in alternate-current wise. Therefore, it may be possible to form a large ground plane in which the high-frequency current flowing in the antenna 38 can flow, so that the performance of the antenna 38 is improved. Hereinafter, the capacitive coupling of the conductive members 26, 28, and 39 will be described in detail.

Figure 17:
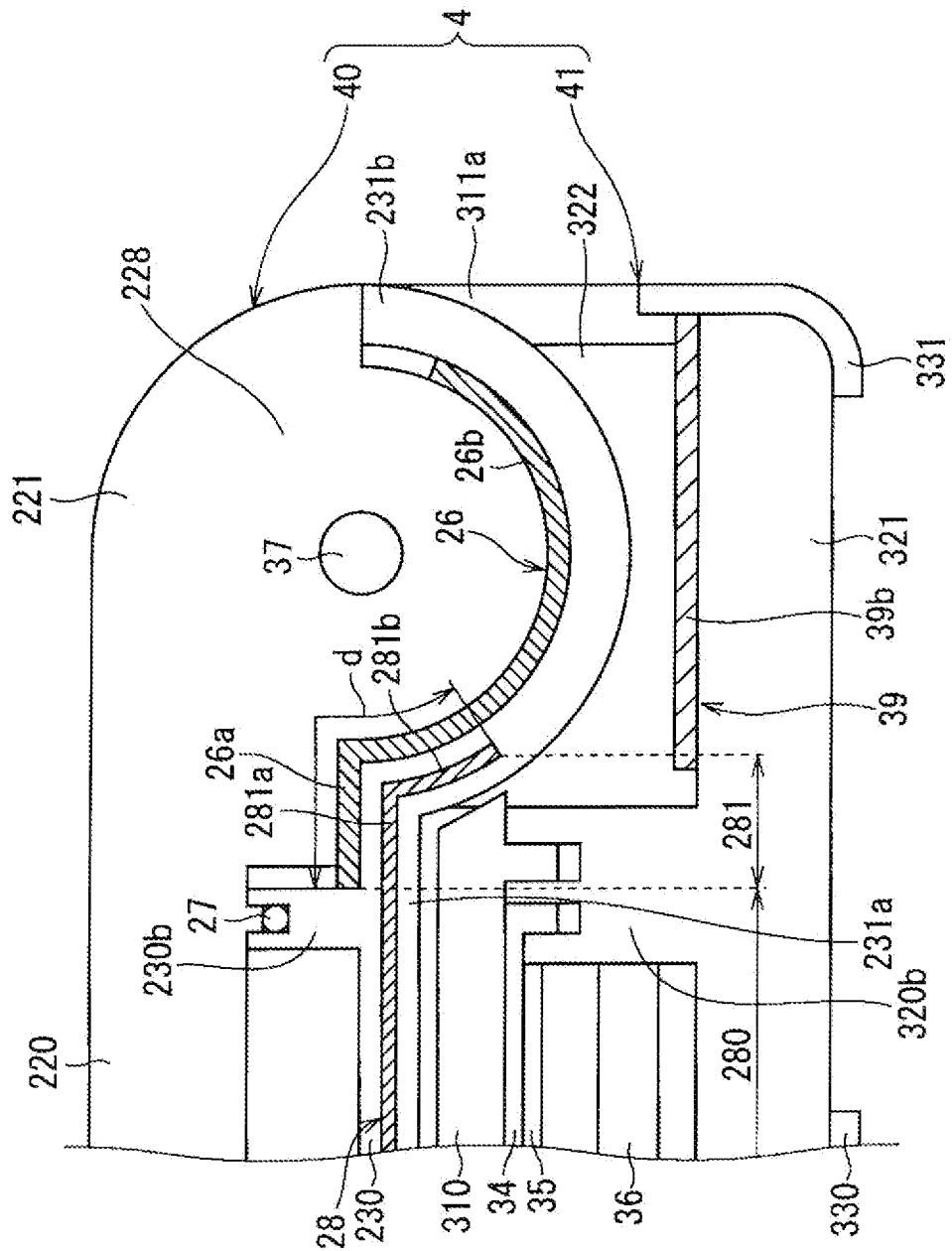
FIG. 17 is a view illustrating a cross-section structure of the vicinity of a hinge mechanism when the portable phone is in a closed state.

FIG. 17 is a view illustrating a schematic section structure of the vicinity of the hinge mechanism 4 when the portable phone 1 is in the closed state. FIG. 17 shows a section structure in a longitudinal direction of the display-side housing 2 and the manipulation-side housing 3. As shown in FIG. 17, the mounted portion 39b of the conductive member 39 provided to the manipulation-side hinge portion 41 and the curved portion 26b of the conductive member 26 provided to the display-side hinge portion 40 are disposed to face each other with the curved portion 231b of the display-side first hinge case 231 interposed therebetween. Therefore, the conductive member 39 and the conductive member 26 are capacitively-coupled with each other.

Meanwhile, as described with reference to FIG. 16, the flat portion 26a of the conductive member 26 and the flat portion 281a of the portion 281 on the inner side of the partition wall of the conductive member 28 are disposed to face each other, and the curved portion 26b of the conductive member 26 and the curved portion 281b of the portion 281 on the inner side of the partition wall of the conductive member 28 are disposed to face each other. Therefore, the conductive member 26 and the conductive member 28 are capacitively-coupled with each other.

As described above, in the hinge mechanism 4 of the portable phone 1, the conductive member 39 electrically connected to the ground pattern of the manipulation-side substrate 36, and the conductive member 26 capacitively-coupled with the conductive member 28 electrically connected to the ground pattern of the display-side substrate 24 are capacitively-coupled with each other, such that the ground pattern of the manipulation-side substrate 36 and the ground pattern of the display-side substrate 24 are connected to each other in alternate-current manner. Therefore, the ground plane in which the high-frequency current flowing in the antenna 38 can flow becomes large, and thus the performance of the antenna 38 can be improved. Further, since the conductive member 28 is insertion-molded over a wide range of the display-side front member 23, the ground plane becomes large, and thus the performance of the antenna 38 is improved.

Furthermore, in the present illustrative embodiment, since the conductive members 26 and 39 capacitively-coupled with each other are provided to the display-side hinge portion 40 and the manipulation-side hinge portion 41, respectively, even when the display-side housing 2 and the manipulation-side housing 3 are in the closed state as shown in FIG. 17, or in the open state, it is possible to connect the ground pattern of the manipulation-side substrate 36 and the ground pattern of the display-side substrate 24 in alternate-current wise, and thus the performance of the antenna 38 is improved. In other words, the capacitive coupling of the conductive members 26 and 29 implemented in the hinge mechanism 4 may make it possible to improve the performance of the antenna 38 regardless of the open or closed state of the portable phone 1.

When the portable phone 1 transitions from the closed state to the open state, although a distance between the conductive member 26 provided to the display-side hinge portion 40, and the conductive member 39 provided to the manipulation-side hinge portion 41 becomes larger than that in a case where the portable phone 1 is in the closed state, since the conductive member 39 and the conductive member 26 are disposed to face each other, the conductive member 39 and the conductive member 26 are capacitively-coupled with each other. Since both of the conductive member 26 and the conductive member 28 are provided to the display-side housing 2, even when the portable phone 1 transitions between the open state and the closed state, the relation of position relative to each other between the conductive member 26 and the conductive member 28 does not change, and thus the conductive member 28 and the conductive member 26 are capacitively-coupled with each other. Therefore, it is possible to connect the ground pattern of the manipulation-side substrate 36 and the ground pattern of the display-side substrate 24 in alternate-current wise, regardless of the open or closed state of the portable phone 1.

Figure 18:
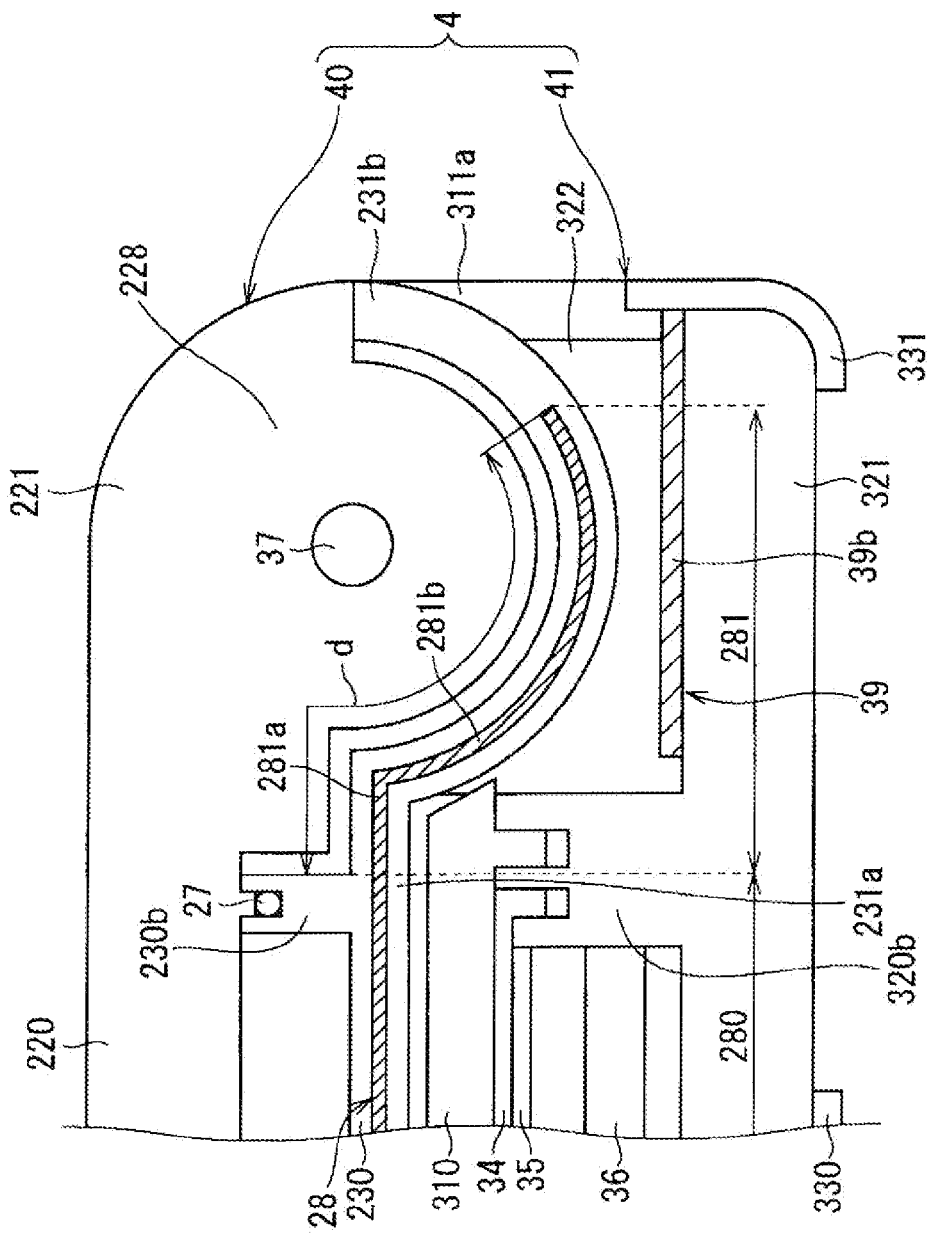
FIG. 18 is a view illustrating a cross-section structure of the vicinity of a hinge mechanism in a portable phone comparative to the portable phone according to the illustrative embodiment.

Here, as shown in FIG. 18, if it is possible to extend the conductive member 28 (curved portion 281b), insertion-molded in the display-side housing 2, toward the display-side first hinge case 231, it may be possible to strengthen the capacitive coupling of a portion of the conductive member 28 in the display-side hinge portion 40 and the conductive member 39 in the manipulation-side hinge portion 41. In this case, the conductive member 26 becomes unnecessary.

However, if the conductive member 28 extends too far toward the outside of the partition wall 230b for waterproofing surrounding the display-side substrate 24, when the conductive member 28 is insertion-molded in the display-side housing 2, the conductive member 28 is easily exposed on the outer side of the partition wall 230b from the thickness portion of the display-side housing 2. In other words, if the extension distance d (see FIG. 18) of the conductive member 28 toward the outer side of the partition wall 230b relative to the portion 281 on the inner side of the partition wall increases, the conductive member 28 is easily exposed on the outer side of the partition wall 230b from the thickness portion of the display-side housing 2. If the conductive member 28 is exposed on the outer side of the partition wall 230b from the display-side housing 2, water penetrates through the exposed portion, and enters the inner side of the partition wall 230b along the interface between the conductive member 28 and the display-side housing 2. On the inner side of the partition wall 230b, the conductive member 28 is partially exposed from the display-side housing 2 due to a recipe of the insertion-molding. Therefore, the water entering the inner side of the partition wall 230b along the interface between the conductive member 28 and the display-side housing 2 enters a space surrounded by the partition wall 230b where there are the electronic components, so that the waterproofing performance of the portable phone 1 is degraded. This problem will now be described in detail.

Figure 19:
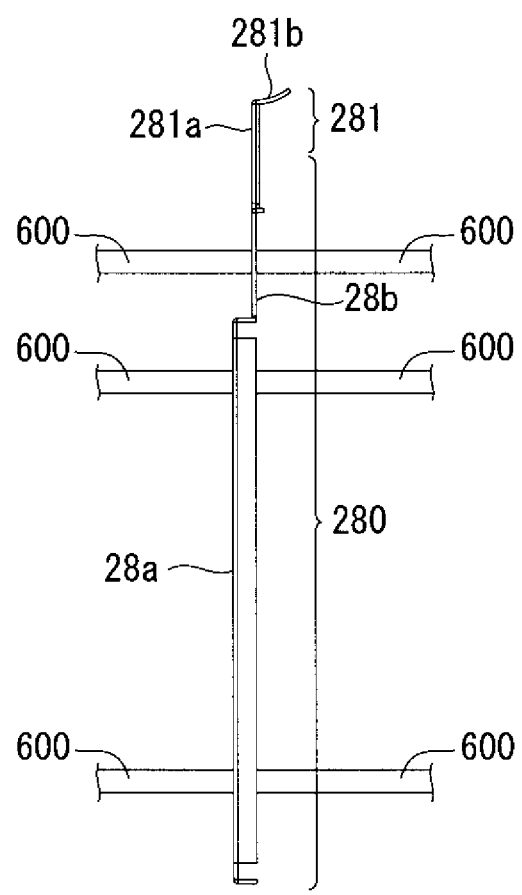
FIG. 19 is a view illustrating the still another conductive member held by insertion pins.

When the conductive member 28 is insertion-molded in the display-side front member 23, first, the conductive member 28 is filled in a mold. In the mold, as shown in FIG. 19, the conductive member 28 is put and held in the middle by a plurality of insertion pins 600. Then, a forming material (resin) is poured into the mold. Next, the forming material in the mold is hardened, so that the conductive member 28 and the display-side front member 23 are integrally formed.

As described above, in the insertion-molding, since the conductive member 28 is held by the insertion pins 600, the forming material does not flow to portions of the conductive member 28 in contact with the insertion pins 600, so that the corresponding portions are exposed from the thickness portion of the display-side front member 23. If the portion 281 on the inner side of the partition wall of the conductive member 28 is held by the insertion pins 600, the portion 281 on the inner side of the partition wall formed in the thickness portion of the display-side front member 23 is partially exposed from the thickness portion. In this case, water penetrates through the exposed portion of the portion 281 on the inner side of the partition wall. Water penetrating through the exposed portions of the portion 281 on the inner side of the partition wall enters the inner side of the partition wall 230b along the interface between the conductive member 28 and the display-side front member 23 existing in the thickness portion of the display-side front member 23. In the insertion-molding, the portion 280 on the inner side of the partition wall of the conductive member 28 is held by the insertion pins 600, the inner portion 280 is partially exposed from the thickness portion of the display-side front member 23. Therefore, water entering the inner side of the partition wall 230b along the interface between the conductive member 28 and the display-side housing 2 enters the space surrounded by the partition wall 230b, so that the waterproofing performance of the portable phone 1 is degraded. Therefore, it is impossible to hold the portion 281 on the inner side of the partition wall by the insertion pins 600.

As shown in FIG. 18, if the extension distance d of the portion 281 on the inner side of the partition wall which cannot be held by the insertion pins 600 increases for the purpose of controlling a degradation in waterproofing performance, when the forming material is poured into the mold, the portion 281 on the inner side of the partition wall which is not being held is easily bent due to a pressure generated at that time. As a result, after the molding, the portion 281 on the inner side of the partition wall is easily exposed from the thickness portion of the display-side front member 23, so that the waterproofing performance is degraded, similarly to the case where the portion 281 on the inner side of the partition wall is held by the insertion pins 600.

In contrast, in the present illustrative embodiment, in order to implement the capacitive coupling in the hinge mechanism 4, separately from the conductive member 28 insertion-molded in the display-side housing 2, the conductive member 26 is provided in the display-side hinge portion 40 so as to be capacitively-coupled with the conductive member 39 in the manipulation-side hinge portion 41. Since the conductive member 26 and the partition wall 230b are provided in the same display-side housing 2, as shown in FIG. 17, it is possible to dispose the conductive member 26 close to the partition wall 230b. In an example of FIG. 17, the conductive member 26 is disposed to be in contact with the outer side surface of the partition wall 230b. Therefore, it may be possible to capacitively couple the conductive member 28 with the conductive member 26 only by slightly extending the conductive member 28 toward the outer side of the partition wall 230b. Thus, as shown in FIG. 17, it is possible to suppress the extension distance d of the conductive member 28 toward the outer side of the partition wall 230b relative to the portion 281 on the inner side of the partition wall. As a result, when the conductive member 28 is insertion-molded in the display-side housing 2, bending of the portion 281 on the inner side of the partition wall which cannot be held by the insertion pins 600 becomes difficult, and it is possible to suppress the portion 281 on the inner side of the partition wall from being exposed from the thickness portion of the display-side housing 2 after the molding. Therefore, it may be possible to improve the performance of the antenna 38 while maintaining the waterproofing performance.

Further, in the present illustrative embodiment, as shown in FIGS. 13 to 15, since the squeezed portion 282 is provided at the portion 281 on the inner side of the partition wall which cannot be held by the insertion pins 600, bending of the portion 281 on the inner side of the partition wall during the insertion-molding becomes further difficult. Therefore, it is possible to further suppress the portion 281 on the inner side of the partition wall formed at the thickness portion of the display-side housing 2 from being exposed from the thickness portion.

Furthermore, as described above, when a subject member is insertion-molded in a molded product, since the subject member needs to be held by insertion pins, so that the subject member does not move in a mold when a forming material is poured into the mold, portions of the subject member supported by the insertion pins are exposed from thickness portions of the molded product. Therefore, it is possible to determine whether a component has been insertion-molded in a thickness portion of a molded product, according to whether there is an exposed portion of the corresponding member from the molded product.

In the portable phone 1 according to the present illustrative embodiment, the hinge mechanism 4 with one shaft is used. However, a two-shaft hinge mechanism may be used such that the display-side housing 2 is rotatable around shafts according to a longitudinal direction of the display-side housing 2.

Further, in the above-mentioned illustrative embodiment, a case where the present invention is applied to the portable phone has been described. However, the present invention can be applied to other communication apparatuses. For example, the present invention can be applied to a game machine having a radio communication function, a digital audio player having a radio communication function, etc.

What is claimed is:

1. A communication apparatus configured to perform communication using an antenna, comprising:
   first and second housings which are connected to each other by a hinge mechanism to be openable and closable,
   wherein the first housing includes:
      a first substrate which includes electronic components mounted thereon and electrically connected to the antenna;
      a first-housing-side hinge portion which configures a portion of the hinge mechanism; and
      a first conductive member which is electrically connected to a ground pattern of the first substrate,
   wherein the second housing includes:
      a second substrate which includes electronic components mounted thereon;
      a waterproofing partition wall which surrounds the second substrate;
      a second-housing-side hinge portion which is provided on an outer side relative to the partition wall, and configures a portion of the hinge mechanism;
      a second conductive member; and
      a third conductive member which is insertion-molded in the second housing, and is electrically connected to a ground pattern of the second substrate,
   wherein the first conductive member is provided in the first-housing-side hinge portion,
   wherein the second conductive member is provided in the second-housing-side hinge portion to be capacitively-coupled with the first conductive member, and
   wherein the third conductive member includes:
      an inner portion which is positioned on an inner side relative to an outer side surface of the partition wall, and is electrically connected to the ground pattern of the second substrate; and
      an outer portion which extends from the inner portion toward an outer side of the partition wall, and is capacitively-coupled with the second conductive member.

2. A communication apparatus configured to perform communication using an antenna, comprising:
   first and second housings which are connected to each other by a hinge mechanism to be openable and closable,
   wherein the first housing includes:
      a first substrate which includes electronic components mounted thereon and electrically connected to the antenna;
      a first-housing-side hinge portion which configures a portion of the hinge mechanism; and
      a first conductive member which is electrically connected to a ground pattern of the first substrate,
   wherein the second housing includes:
      a second substrate which includes electronic components mounted thereon;
      a waterproofing partition wall which surrounds the second substrate;
      a second-housing-side hinge portion which is provided on an outer side relative to the partition wall, and configures a portion of the hinge mechanism;
      a second conductive member; and
      a third conductive member which is formed in a thickness portion of the second housing, and is electrically connected to a ground pattern of the second substrate,
   wherein the first conductive member is provided in the first-housing-side hinge portion, wherein the second conductive member is provided in the second-housing-side hinge portion to be capacitively-coupled with the first conductive member, and wherein the third conductive member includes:
- an inner portion which is positioned on an inner side relative to an outer side surface of the partition wall, and is electrically connected to the ground pattern of the second substrate; and
- an outer portion which extends from the inner portion toward an outer side of the partition wall, is capacitively-coupled with the second conductive member, and is not exposed from the thickness portion of the second housing.

3. The communication apparatus according to claim 2,
wherein the inner portion of the third conductive member is partially exposed from the thickness portion of the second housing.

4. The communication apparatus according to claim 1,
wherein the outer portion of the third conductive member is formed with a squeezed portion.

5. The communication apparatus according to claim 2,
wherein the outer portion of the third conductive member is formed with a squeezed portion.

* * * * *